Nov. 23, 1965 C. D. BERGER 3,218,876
VARIABLE SPEED POWER PROPELLED APPLIANCES
Filed July 15, 1963 4 Sheets-Sheet 1

Nov. 23, 1965 C. D. BERGER 3,218,876
VARIABLE SPEED POWER PROPELLED APPLIANCES
Filed July 15, 1963 4 Sheets-Sheet 2

Nov. 23, 1965 C. D. BERGER 3,218,876
VARIABLE SPEED POWER PROPELLED APPLIANCES
Filed July 15, 1963 4 Sheets-Sheet 3

Nov. 23, 1965         C. D. BERGER         3,218,876
VARIABLE SPEED POWER PROPELLED APPLIANCES
Filed July 15, 1963                     4 Sheets-Sheet 4

United States Patent Office 3,218,876
Patented Nov. 23, 1965

3,218,876
VARIABLE SPEED POWER PROPELLED
APPLIANCES
Christian D. Berger, North Canton, Ohio, assignor to The
Hoover Company, North Canton, Ohio, a corporation
of Ohio
Filed July 15, 1963, Ser. No. 295,117
15 Claims. (Cl. 74—202)

The present invention relates to self propelled appliances such as suction cleaners, floor polishers, lawnmowers or any other appliance which, in normal use, is moved across a surface by an operator.

More particularly, the invention relates to that type of appliance which follows the operator, i.e. when the operator moves forwardly the appliance is power propelled forwardly and when the operator moves rearwardly the appliance is power propelled rearwardly. In general, that type of appliance is old in the prior art.

Prior art

However, prior art appliances of this type have not gone into general use because of serious drawbacks when put into use.

In the prior art, once the appliance has attained its speed of movement from a standstill position, that speed is dependent solely on the speed of the power source and will vary as the speed of the power source varies.

In the prior art the ratio of the speed of the driving element to that of the wheels is fixed so that the operator has to adjust his speed to that of the appliance.

The prior art also ignores the fact that the appliance must be brought up to speed from a dead standstill. When the operator pushes forward the drive for the wheels tends to attain their fixed speed immediately with the result that the appliance will jump forward.

Of course where a friction drive is used there will be some slippage at the start but the appliance will still jump because there is no way of regulating the rate at which the friction drive is applied.

The jumping action will tend to pull the appliance away from the operator with the result that the drive will be released. When the operator catches up, another jump will occur. As can be seen such operation would be entirely unsatisfactory.

The only way to obviate that difficulty would be for the operator to start the appliance at a speed greater than that for which it is geared.

In that case, the operator would have to move the appliance against the resistance of the drive as well as to overcome the resistance to movement caused by bringing the appliance up to speed.

Of course the speed of the appliance could be changed by changing the gear ratio but that would not solve the problem.

When the operator reverses the movement of the appliance such defects are multiplied.

The operator must overcome the momentum of the appliance caused by its forward movement and by the resistance caused by the reverse movement.

If jumping is to be avoided the operator must override the drive in both the forward and backward movement of the appliance.

In using a suction cleaner in a narrow space the operator usually makes a number of short back-and-forth strokes in quick succession. Under such conditions the power drives of the prior art are a hindrance rather than a help as the operator must override the drive in both directions upon each reversal of the appliance.

Another defect of the prior art is the fact that the power source may change in speed under load.

For example, when a suction cleaner is moved over a deep napped surface, there is more resistance to movement than when it is moved over a carpet with a thin nap or over a bare floor.

Additionally, there is more resistance to forward movement of a suction cleaner than to rearward movement.

With lawn mowers there is much more resistance to movement when going up hill than when on the level or going down hill.

In each of the above circumstances the motor will slow down or speed up with the result that the speed of movement of the appliance will slow down or speed up. The operator must therefore adjust his speed accordingly or override the drive which would require more force.

The invention

According to applicant's invention the speed of movement of the appliance is independent of that of the power source and follows the movement of the operator of his hand precisely regardless of the resistance to movement encountered whether it be caused by the load on the appliance or by its resistance to movement as it is started or reversed. There is no jumping action as the appliance is started or reversed.

According to the invention a controllable torque coupling is provided in the transmission between the power source and the propelling or traction wheels in which the propelling action of the wheels is proportional to the force applied by the operator.

The torque coupling is in the form of a rotary driving element, driven by the power source which in turn drives a rotary driven element. The driven element drives the propelling wheels.

The driving element always slips relative to the driven element so that, during use, the ratio of movement between the driving and driven elements can never be a one to the ratio.

The contacting surfaces between the driving and driven elements are made of friction material and provision is made for the wearing away of the friction material without affecting its performance during the life of the appliance.

The means which applies a force to the driving element to force it into frictional contact with the driven element may be the handle of the appliance or a manually actuated element movably mounted on the handle and connected by a linkage to the driving element of the torque coupling. It may also be independent of the handle.

The frictional resistance of the contacting surfaces between the driving and driven elements of the torque coupling is preferably substantially independent of the relative speed between the elements. The torque transmitted to the traction wheels is therefore substantially proportional to the controlling force which is manually applied to the coupling at any speed of the driven element, even zero speed. In other words the speed of the driving element has no relation to the speed of the driven element, and the torque applied to the driven element depends only on the manually applied controlling force.

As a result of the above arrangement the appliance can be propelled continuously at greatly different rates of speed, at high speed, at moderate speed, at low speed, in fact at any speed from and including zero on up to the maximum speed for which it is designed. The speed of motion can, of course, also be varied at will. In the prior art, the maximum speed is the only speed at which the appliance can be propelled.

It is to be particularly noted that the speed of the appliance will at all times be substantially equal to the speed of the hand applying the controlling force to the appliance, while at the same time the propelling torque acting on the traction wheels is substantially proportional to the force applied by the hand.

In order to move the appliance at a constant speed over a surface offering a constant resistance to motion at that speed, it is merely necessary to apply a constant manual force on the control. As previously stated, the speed can be as slow or fast as desired.

In order to change the speed of the appliance, it is merely necessary to manually accelerate or decelerate the motion of the control. Because of the resistance to a change in motion of the appliance the force that the hand applies to the control is thereby automatically increased or decreased. This in turn increases or decreases the torque applied to the traction wheels by the torque coupling and causes acceleration or deceleration of the appliance so that the appliance closely follows the movement and changes in movement of the control by virtue of the changing force applied thereto.

It is apparent from the above that the appliance responds to the movement and force applied by the operator in a way that is similar to the way an ordinary appliance without propulsion means responds to manipulation, with one important exception. The force required to manipulate this appliance is at all times substantially less than it would be without the proper propelling means. The fact that the appliance acts like an ordinary one while requiring less force to manipulate is a very desirable feature as it means no special training or skill is needed in order to operate it.

The frictional resistance of the contacting surfaces between the driving and driven elements of the torque coupling is such that the torque transmitted to the traction wheels will propel the appliance against the resistance to movement of the appliance under all conditions of use while permitting the driving element to slip relative to the driven element.

As the speed of the traction wheels and of the driven elements of the torque coupling is directly proportional to the speed of the operator while the speed of the driving elements of the torque coupling is substantially fixed by the motor speed, slippage between the driving and driven elements is variable and increases with decrease in speed of the appliance.

In no case is the speed ratio between the driving and driven elements a one-to-one ratio where there is no slippage between them.

The pressure applied by the driving element is proportional to the resistance to movement of the appliance along its supporting surface and to the force applied by the operator.

When the appliance is first started, pressure is applied to the driving element by the force applying means actuated by the operator and the appliance starts to accelerate smoothly as the force is applied.

That action happens despite the resistance to movement of the appliance so that there is no jumping, the appliance is brought up to speed gradually and continues to move at precisely the speed of the operator.

The same thing happens when the direction of movement of the appliance is reversed. The appliance is smoothly stopped and gradually started in a reverse direction.

If the resistance to movement of the appliance over its supporting surface increases, a greater pressure is applied to the driving element by the normal movement of the operator and the torque at the traction wheels is automatically increased.

The same thing happens if the resistance to movement of the appliance decreases except that the appliance will have a tendency to move away from the operator. The normal movement of the operator will decrease the pressure on the driving element and the appliance will automatically slow down.

Should the load on the appliance increase to such an extent that the motor slows down, the appliance will continue to move at the same speed as before. Since the operator is moving at the same speed as before, the slippage between the driving element and driven element will decrease and the appliance will continue at the same speed as before. The same is true if the motor speeds up except that the slippage increases.

It is another feature of the invention that when motion of the appliance is slowed down by manually applying a decelerating force the frictional elements of the torque coupling act as a brake and dissipate the kinetic energy of the appliance. The motion of the appliance can thus be more quickly arrested with less application of force than in the prior art arrangements.

This same braking action permits the appliance, which may be a lawnmower, for example, to be held stationary from rolling down a steep hillside with little expenditure of manual force.

There is a mechanical advantage linkage between the force applying means, actuated by the operator, and the driving element so that the force applied by the operator is only a fraction of that applied to the driving element.

The force applying means may include an hydraulic or a pneumatic system in which the operative force is applied to a bellows of small area which transmits the resulting pressure through a tube, suitably secured to the handle, to a bellows or diaphragm of larger area so that the force applied by the larger area bellows or diaphragm will be increased by the ratio of the areas of the two.

Alternatively the force applying means may be in the form of a mechanical linkage which increases the force applied to the driving element over that applied by the operator.

As a further alternate, the force between the driving and driven elements may be varied by an electroadhesive type slip clutch in which the slippage is varied by the voltage applied and the voltage varied by manually actuated means, such as by cutting more or less resistance into or out of the circuit.

Also according to the invention the torque applied to the propelling wheels is rendered greater than the torque of the driven element by means of a speed reducing gearing between the driven element and the wheels thus further reducing the force necessary to be applied by the operator.

According to the invention, the speed of the motor, with the speed ratio of the gearing between the motor shaft and the traction wheels taken into consideration, should be slightly greater than that necessary to drive the wheels at the maximum speed desired so as to allow for the slippage between the driving and driven elements.

In order to render the appliance easily steered, the transmission between the driven element and the traction wheels includes a slip clutch for each wheel. Thus if the appliance is turned to the right, the left hand wheel is required to move faster than it is being driven and the right hand wheel is required to move slower.

In making a left turn the reverse would be true.

The slip clutches in the transmission would provide for such movement.

However, the clutches must be set to slip at a torque higher than any that may be encountered in normal use.

According to all modifications of the invention, the movement of the handle or other means actuated by the operator relative to the appliance is so small that the operator has little conscious feeling of such movement even when the appliance is moved back and forth in short quick strokes.

According to all modifications of the invention, the appliance operates smoothly under all conditions of use and follows the movements of the operator precisely.

When there is a tendency for the appliance to slow down or speed up for any reason, its speed is automatically held at the same speed as that of the operator.

Other objects and advantages of the invention will become apparent as the description proceeds when taken in connection with the accompanying drawings in which.

Figures 1, 2, 3:
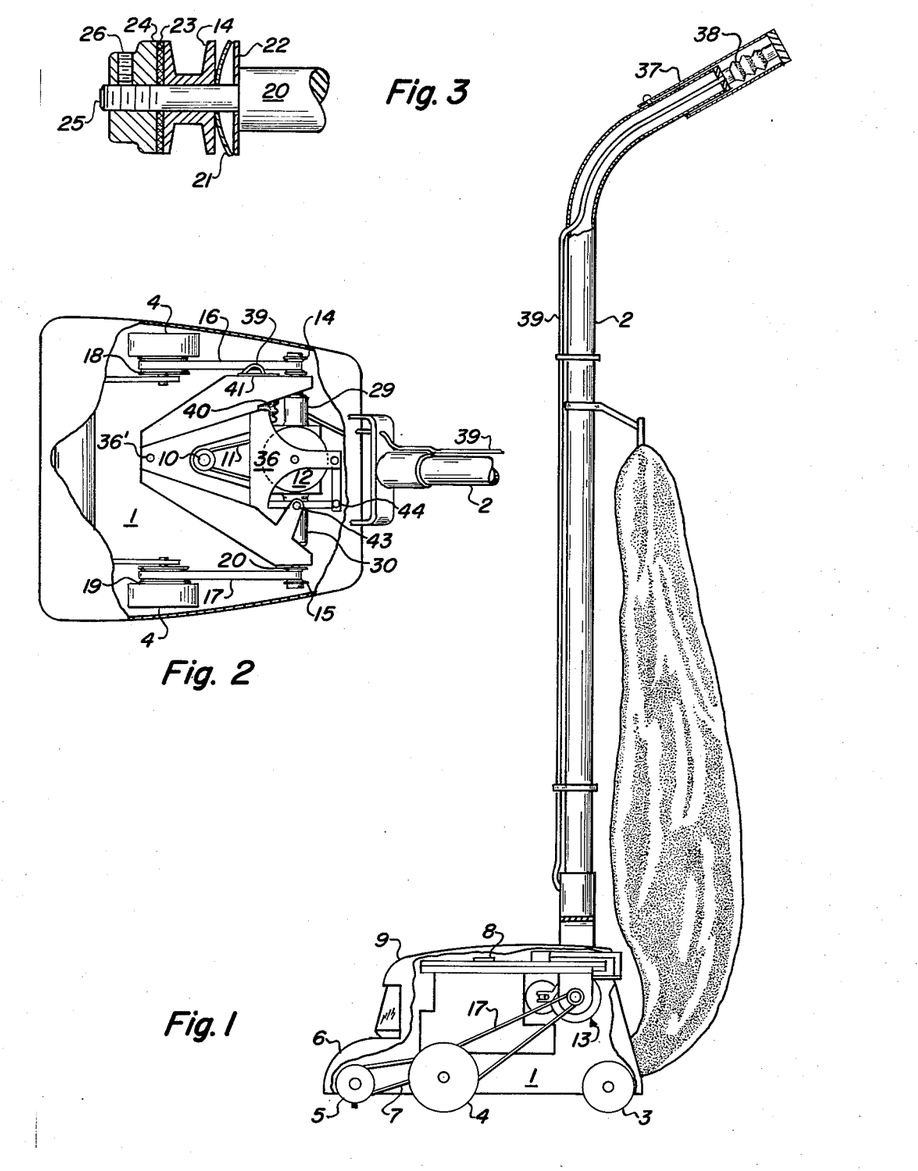
FIG. 1 is a side view of a suction cleaner with the invention applied thereto, partly broken away to show certain details of construction.
FIG. 2 is a top view of the body of the cleaner of FIG. 1 with the cover broken away to show certain details.
FIG. 3 is a detailed segmental view showing how the pulleys which drive the traction wheels are mounted on the driving shaft.

*FIGS. 1–6.*—Referring to FIG. 1 the reference numeral 1 represents the frame of the cleaner and 2 its handle, by which it is steered. The handle 2 is pivotally mounted on the rear of frame 1 by means not shown.

The cleaner is mounted on rear wheels 3 and front wheels 4 which are power driven as will appear. An agitator 5 is rotatably mounted in a suction nozzle 6.

A suction is drawn on the interior of nozzle 6 by a motor-fan unit, not shown, and the agitator 5 is rotated, preferably counter clockwise, by a belt 7 driven by a pulley on the lower end of the motor shaft 8. The fan discharges into a filter bag as shown. The working parts of the cleaner are covered by an appearance housing 9 suitably secured to the frame 1.

The traction wheels 4 are driven from the motor shaft 8 by a pulley 10 (FIG. 2) secured to the upper end of shaft 8, belt 11 surrounding a pulley on a bevel gear 12, torque coupling 13, pulleys 14 and 15 and belts 16 and 17 which surround the pulleys 18 and 19 attached to the wheels 4 and rotatably secured to the frame 1 in any suitable manner.

Pulleys 14 and 15 are secured to the opposite ends of the output shaft 20 (FIG. 5) to the torque coupling 13 by means of friction clutches as shown by FIG. 3. FIG. 3 shows the mounting for pulley 14, it being understood that pulley 15 is mounted in the same manner.

A bowed spring disc 21, presses between the pulley 14 and a disc 22 abutting against a shoulder on shaft 20 to force the pulley 14 against a friction disc 23 by an adjusting nut 24, which may be fixed to an extension 25 of shaft 20 by means of a set screw 26.

The friction between the pulleys and the friction disc 23 may be adjusted by screwing the nut 24 on the threaded extension 25 of shaft 20 after which the nut 24 is locked in place by tightening the set screw 26.

As will appear the slippage torque of those clutches should be greater than the maximum torque applied to the wheels 4 by the torque coupling 13 during normal use of the cleaner.

The torque coupling 13 comprises the previously mentioned bevel gear 12 and the shaft 20 upon the ends of which, the pulleys 14 and 15 are mounted.

Each of the driving elements 27 and 28 includes, at one end, an annular flange facing a similar flange on the driven elements. At its opposite end, each driving element is provided with a bevel gear adapted to mesh with gear 12, as will appear.

Figure 4:
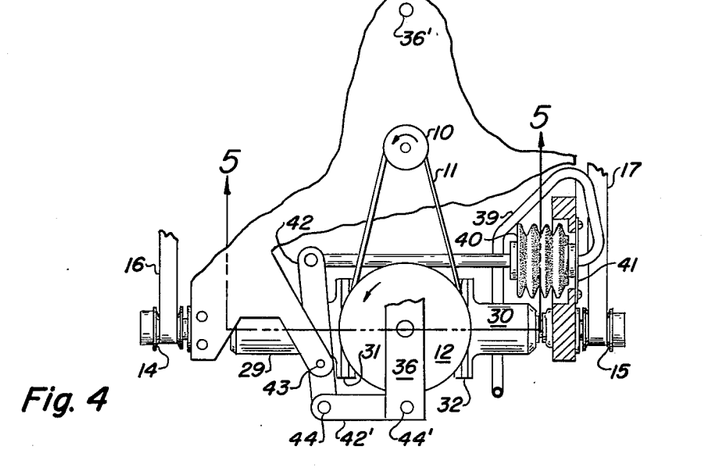
FIG. 4 is a segmental top view of a portion of the drive for the traction wheels and of the control therefor for the cleaner of FIG. 1.
Figure 5:
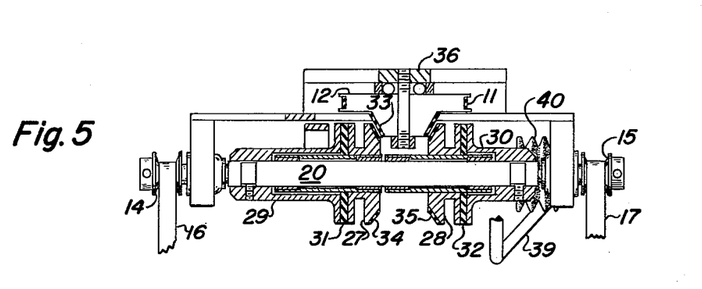
FIG. 5 is a sectional view taken on line 5—5 of FIG. 4 looking in the direction of the arrows.

As shown by FIGS. 4 and 5, the driving elements of the torque coupling 13 consist of two bevel gears formed on the inner ends of driving elements 27 and 28. They are adapted to be selectively moved into frictional mesh with the gear 12 and are freely rotatable and slidable on the shaft 20 between the driven elements 29 and 30.

The driving elements 27 and 28 are adapted to drive driven elements 29 and 30 fixed to the shaft 20 as shown in FIG. 5. Each of the driven elements 29 and 30 is provided with an annular flange facing similar annular flanges formed on the driving elements 27 and 28.

Friction discs 31 and 32 are positioned between the flanges of the driving and driven elements 27 and 28 and 29 and 30.

The discs 31 and 32 are made of such material that the driving elements 27 and 28 will always slip relative to the driven elements 29 and 30 under all ordinary conditions of use. Provision is made for the wearing away of discs 31 and 32 without affecting the operation thereof during the lifetime of the cleaner.

As will appear the gear 12 is selectively brought into meshing engagement with the gears formed on the inner ends of driving elements 27 and 28 to positively rotate them in opposite directions. For that purpose a friction member 33 is bonded to the inclined face of gear 12 and similar friction members 34 and 35 are bonded to the inclined faces of the gears of elements 27 and 28 respectively.

The material of the friction members 33, 34 and 35 is such that little or no slippage will occur during all conditions of use so that the slippage will occur at the discs 31 and 32 between the driving elements 27 and 28 and driven elements 29 and 30 respectively.

The gear 12 is continuously rotated, by the motor of the appliance, in a counterclockwise direction as shown by the arrow FIG. 4.

As shown by FIG. 5 the gear 12 is in its neutral position relative to the gears of elements 27 and 28. Movement of the gear 12 to the left will engage it with the gear of element 27 and rotate it clockwise as viewed from the left. Movement of the gear 12 to the right will engage it with the gear of element 28 and rotate it counterclockwise as viewed from the left.

Thus, by viewing FIG. 1 it is evident that in moving the gear 12 to the left as viewed in FIG. 5, the torque will be applied to traction wheels 4. The wheels will tend to be rotated clockwise as viewed from the left in FIG. 1 and the cleaner will be urged rearward. If the gear 12 is moved to the right the traction wheels will tend to be rotated counterclockwise as viewed from the left in FIG. 1 and the cleaner will be urged forward.

The gear 12 is rotatably mounted on a lever 36 pivoted to the frame at 36' and which is moved to the right or to the left by a manually actuated device mounted on the handle and responsive to a force applied by the operator.

Figures 6, 7, 8, 9:
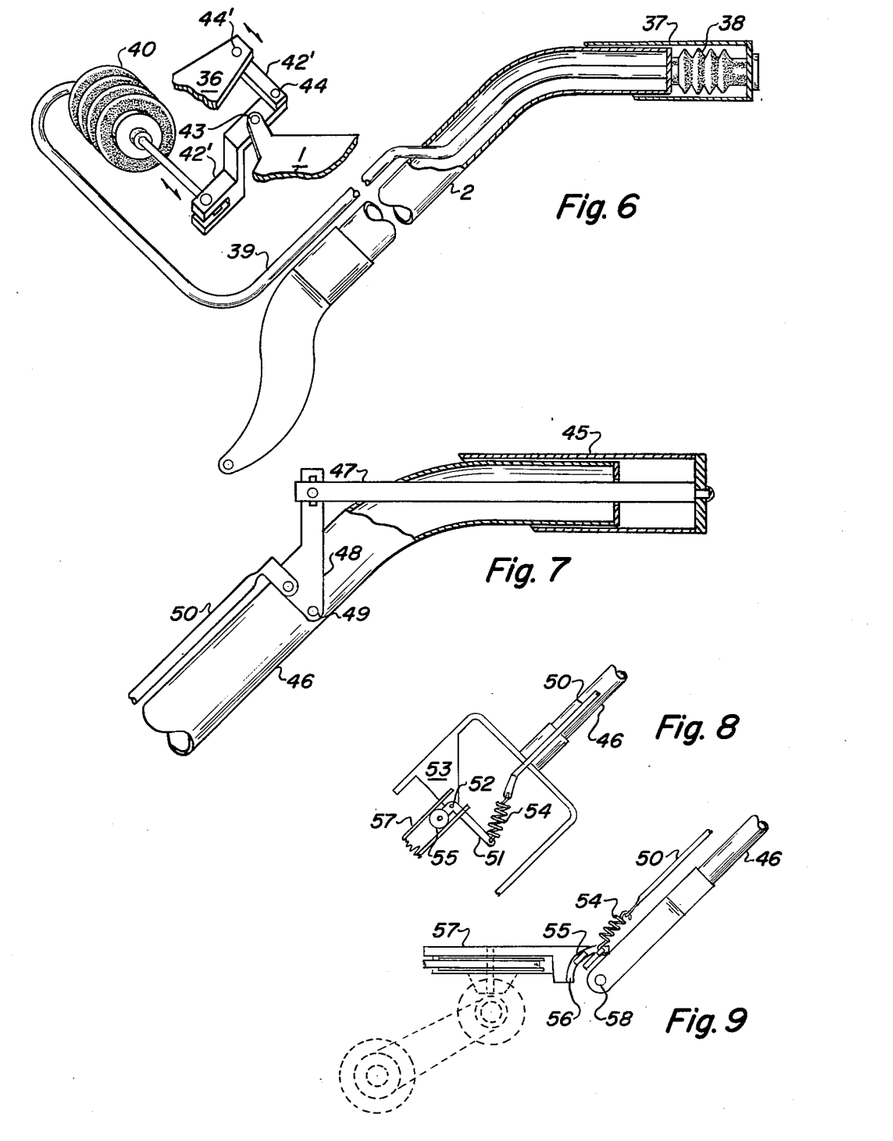
FIG. 6 is a segmental view of the torque coupling control for the cleaner of FIG. 1.
FIGS. 7, 8 and 9 are detailed views of a modified form of the torque coupling control usable with the cleaner of FIG. 1.

Referring to FIGS. 1 and 6 the manually actuated member is in the form of a sleeve 37 slidably mounted on the upper end of handle 2.

The bellows 38 is interiorly connected to a plastic tube 39 which extends downwardly along the handle 2 and is interiorly connected to a bellows 40 of larger diameter.

One end of bellows 40 is anchored to the frame 1 at 41, FIGS. 2 and 4, and its other end is pivotally connected to a lever 42, pivoted at 43 to the frame 1. The other end of lever 42 is pivoted at 44 to a link 42' pivoted to the lever 36 at 44'.

The bellows 38 and 40 and the tube 39 are filled with any suitable fluid. Movement of the sleeve 37 to the left will compress the bellows 38 and create a pressure in the fluid system. The force applied to lever 42 will be greater than that applied at sleeve 37 because the area of bellows 40 is greater than that of bellows 38. The mechanical advantage of the leverage system between bellows 40 and lever 36 also lessens the force necessary to be applied to sleeve 37.

By increasing or decreasing the quantity of fluid placed in the fluid system the control can be biased so as to apply an initial positive or negative force to the torque coupling which may be used to counteract a forward or rearward drag characteristic of a particular appliance.

*Operation of FIGS. 1 to 6.*—The continual slippage of the driving elements 27 and 28 of the torque coupling 13 relative to the driven elements 29 and 30 is the secret of the close control of the movement of the cleaner responsive to the movements of the operator. The full power applied is never transmitted to the traction wheels, the excess power being dissipated in the form of heat at the friction discs 31 and 32.

By varying the amount of slippage and thus the amount of energy dissipated in the form of heat the torque applied at the wheels can be varied by infinitesimal amounts by a small pressure change applied by the operator at the handle.

Forward movement of the sleeve 37 will cause a pressure to applied to the bellows 40 causing it to expand and pivot the lever 42 counterclockwise and move the lever 36 to the right.

Movement of the gear 12 to the right will mesh it with the gear of element 28 and rotate the shaft 20 and the wheels 4, counterclockwise, as viewed from the left, FIG. 5, as previously explained and the cleaner will tend to move forwardly.

Rearward movement of the sleeve 37 will decrease the pressure in bellows 40 and it will collapse to pivot the lever 42 clockwise and move the lever 36 to the left and engage the gear 12 with the gear of element 27.

That will rotate the shaft 20 and wheels 4 clockwise as previously explained and cause the cleaner to move rearwardly.

If it is desired to turn the cleaner to the right, sideward pressure is applied to move the handle 2 to the left.

The slip clutches between shaft 20 and pulleys 14 and 15 will slip to permit the inside and outside wheels to go faster or slower as required by the manner in which the turn is made.

Upon forward movement of the cleaner, its resistance to movement will tend to retard such movement. However, due to the slippage between the driving element 28 and driven element 30 permitted by the friction disc 32, the cleaner movement will speed up smoothly without any jumping. When the cleaner is up to speed less pressure will be automatically applied to the sleeve 37 by the operator and the movement of the cleaner will follow that of the operator.

If the cleaner is moving forward and a pull is applied to the sleeve 37, the gear 12 will be engaged with the driving element 27 tending to rotate the shaft 20 and wheels 4 reversely. The slip between the elements 27 and 29 permitted by the friction disc 31 will gradually slow the cleaner down and reverse it against its resistance to such reversal.

Should either the forward or backward movement tend to change due to an increase or decrease in the resistance to such movement, the speed of the cleaner will be automatically maintained at the operator's speed.

In the case of an increased resistance, the pressure on the sleeve 37 would be automatically increased by the operator without any conscious effort on his part.

Should the resistance decrease the pressure on the sleeve 37 would be decreased in a similar manner.

Thus the cleaner is smoothly propelled at the speed of the operator regardless of changes in the resistance to its movement, and without any appreciable conscious effort by the operator.

Should the motor slow down or speed up for any reason, the speed of travel of the cleaner will remain constant.

The electrical control for the motor has not been shown since it may be of any known construction. For example, it may be a manual switch mounted on the handle, a switch actuated by movement of the handle from storage position or any other type of control.

The wheels 4 preferably have a tread applied to them so that no slippage will occur between them and the surface over which the cleaner is propelled.

*FIGS. 7, 8 and 9.*—FIGS. 7, 8 and 9 shows an alernative form of a manually actuated leverage system for varying the pressure applied between the driving and driven elements to control the slippage between them in accordance with movements of the operator. The transmission between the motor shaft and traction wheels including the torque coupling 13 is the same as that of the modification of FIGS. 1 to 6.

A sleeve 45 is slidably mounted on the upper end of handle 46, and is connected by a link 47 to the long leg of a bellcrank 48 pivoted to the handle 46 at 49.

The short leg of bellcrank 48 is pivoted to the upper end of a connecting rod 50, which extends downwardly along handle 46 to the long leg of a second bellcrank 51, pivoted at 52 to an extension 53 on one leg of the handle fork. The connecting rod 50 includes a comparatively stiff spring 54, connected to and extending between the lower end of rod 50 and the outer end of bellcrank 51.

The short leg of bellcrank 51 carries a roller 55 which travels in an arcuate track 56 formed in the rear end of the lever 57 which is a modification of the lever 36 of the modification of FIGS. 1 to 6.

The handle 46 is pivoted at 58 to the frame 1 of the modification of FIGS. 1 to 6. The distance between the pivot 58 and the track 56 is such that as the handle 46 is moved up and down during operation the roller 55 will travel in the arcuate track 56 so that the roller 55 will be operative in all positions of the handle.

Each of the bellcranks 48 and 51 have the actuated end longer than the actuating end so that the force applied at the sleeve 45 is multiplied at the roller 55.

The torque coupling 13 and the drive for the wheels 4 are the same as that of the modification of FIGS. 1 to 6 and therefore have not been shown in detail.

*Operation of FIGS. 7, 8 and 9.*—The operation of the torque coupling and of the drive for the traction wheels is the same as that of the modification of FIGS. 1 to 6 and need not be repeated here except to state that this modification has all of the advantages outlined in relation to that of the first modification.

Forward movement of sleeve 45 will be transmitted to the roller 55 with increased force by means of the linkage mechanism described and move the lever 57 as in the modification of FIGS. 1 to 6 and the cleaner will move forward.

Likewise a pull on the sleeve 45 will cause the cleaner to move rearwardly.

The spring 54 is comparatively stiff and is interposed in the linkage system so that the force will be applied to the lever 57 smoothly to prevent the cleaner from jumping. That is especially true when the movement of the cleaner is being reversed.

The fluid means of connecting the actuator to the torque coupling shown in FIG. 6 also possesses the advantages of the resilient connecting spring 54 by virtue of the compressibility of the fluid which effectively acts as a stiff spring.

The spring 54 could be omitted but it has been found that the cleaner operates more smoothly when it is used.

As in the first modification the movement of the cleaner follows the movement of the operator precisely, regardless of changes in conditions, during use.

Figure 10:
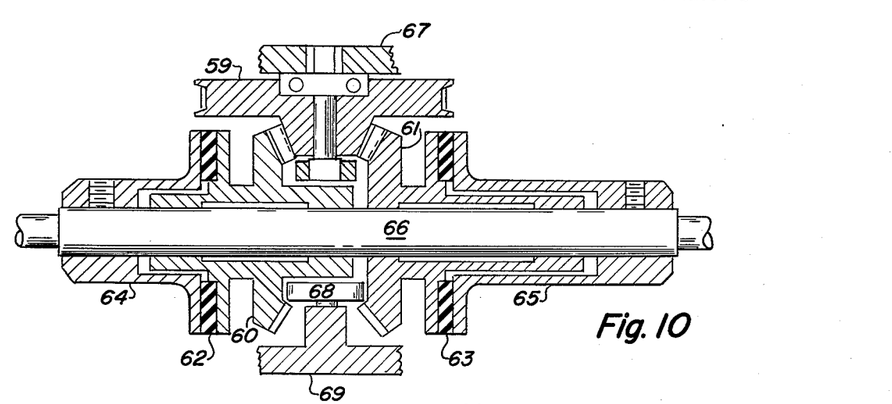
FIG. 10 is a sectional view of a modified form of transmission usable with the cleaner of FIG. 1.

*FIG. 10.*—This figure shows a modified torque coupling which operates similar to that of the first modification and which could be substituted for it.

The gear 59 is continuously rotated while the cleaner is in operation and is in constant mesh with bevel gears 60 and 61 so as to rotate gear 60 clockwise and the gear 61 counterclockwise as viewed from the left.

The gears 60 and 61 form the driving elements and press against friction discs 62 and 63. In the neutral position, which is shown, the discs 62 and 63 are spaced slightly from or in light contact with the faces of the driven elements 64 and 65 so that there is no rotation of those elements. The elements 64 and 65 are rigid with the shaft 66 which corresponds to the shaft 20 of the first modification and which drives the traction wheels of the cleaner.

The gear 59 is rotatably mounted on a bracket 67 which forms a part of the frame of the cleaner corresponding to the frame 1 of the first modification.

The gears 60 and 61 are moved to the right or to the left by a roller 68, rotatably mounted on a shifting lever 69 which is actuated from the handle of the cleaner in the same manner as in the first modification.

When the lever 69 is moved to the left the friction disc 62 is brought into pressure contact with the face of the driven element 64 and the cleaner is moved rearward.

When the lever 69 is moved to the right the friction disc 63 is brought into pressure contact with the face of the driven element 65 and the cleaner moves forward.

The total power applied to the gear 59 is greater than the power applied to the shaft 66 because the material of which the discs 62 and 63 are made is such that there is always a slippage at the interfaces of the discs 62 and 63 and the face of the elements 64 and 65 respectively. The excess energy is dissipated in the form of heat.

The movement of the gears 60 and 61 is small and the meshing teeth of the gears are deep enough that there is a constant mesh between the gears when either gear 60 or 61 is moved into contact with the driven elements 64 or 65.

The torque coupling of FIG. 10 operates in substantially the same manner as that of the first modification and the movement of the cleaner follows precisely that of the operator and in the same manner described in connection with the first modification.

Figure 11:
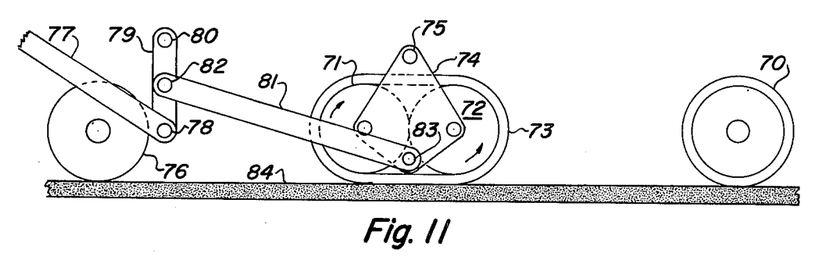
FIG. 11 is a schematic view of a modified form of the invention.

*FIG. 11.*—In this modification, which is shown very schematically, the pressure applied by the operator is applied directly to the driving elements by the handle through a mechanical advantage lever system.

The details of the cleaner are not shown except for the agitator 70.

The agitator 70 and the driving element 71 are constantly driven by the motor of the cleaner in any suitable manner, the element 71 being driven clockwise.

The element 71 is in frictional contact with the driving element 72 so as to constantly rotate it counterclockwise.

An endless traction track 73 having treads surrounds the driving elements 71 and 72. The track 73 thus forms the driven element.

The driving elements 71 and 72 are mounted on a lever 74 pivoted to the frame of the cleaner at 75 and positioned about midway between the rear wheels 76 and the brush 70.

A guiding handle 77 is pivoted at 78 to the lower end of a link 79 which is pivoted at 80 to the cleaner frame. One end of a connecting rod 81 is pivoted at 82 to the link 79 intermediate the pivots 78 and 80 and its other end is pivoted at 83 to the lever 74.

The surfaces of the driving elements 71 and 72 and the interior surface of track 73 is such that there is no slippage between each of the driving elements and the track under all conditions of use. The power applied by the motor is always greater than that applied to the track 73, the excess energy being dissipated in the form of heat. Thus the driving elements 71 and 72 and the track 73 form the torque coupling of this modification.

The drive mechanism of FIG. 11 would normally be positioned midway between the sides of the cleaner so that the tractive force would be applied equally to both sides of the cleaner. However, it is possible according to the invention to place it at one side of the cleaner and place a similar drive at the opposite side. In the latter case the handle would be forked with the ends of the fork being pivoted to the lower ends of the links 79.

*Operation of FIG. 11.*—In the positon shown, the drive is in neutral position and both of the driving elements 71 and 72 will slip relative to the track 73.

A forward force by the operator on the handle 77 causes the lever 74 to pivot counterclockwise about pivot 75 to move the driving element 71 downwardly and increase the pressure between the driving element 71 and track 73. Since the track is in nonslipping frictional engagement with surface 84 the cleaner will move forward.

Similarly a rearward pull on the handle will increase the pressure between driving element 72 and track 73 to cause the appliance to move rearward.

The appliance will be brought up to speed smoothly, stopped smoothly and reversed smoothly in substantially the same manner as in the other modifications.

It is to be noted that the force applied by the operator is only a fraction of that applied to the drivers 71 and 72 due to the mechanical advantage of the linkage system between the handle and the drivers.

In the case where a device such as shown by FIG. 11 is placed on each side of the cleaner and a forked handle is used with the legs attached to the lower ends of links 79 the cleaner is also rendered self steering.

For example, suppose it is desired to make a right turn. The handle is pushed to the left so that the right hand leg will pull back on the link 79 on the right hand side and the left hand leg will push forward on the link 79 on the left hand side.

A backward pull on the right hand link 79 will cause the appliance to move backward on that side. Similarily a forward push on the link 79 at the left will cause the left side of the appliance to move forward. When the turn is negotiated the sideward pressure is released.

This arrangement would be of particular utility in propelling and steering a lawnmower.

This embodiment as applied to suction cleaners has an advantage on deep piled carpets because the pressure of the drivers 71 or 72 on the carpet tends to raise the nozzle of the cleaner and thus adjust its position relative to the surface of the pile.

Figures 12, 13:
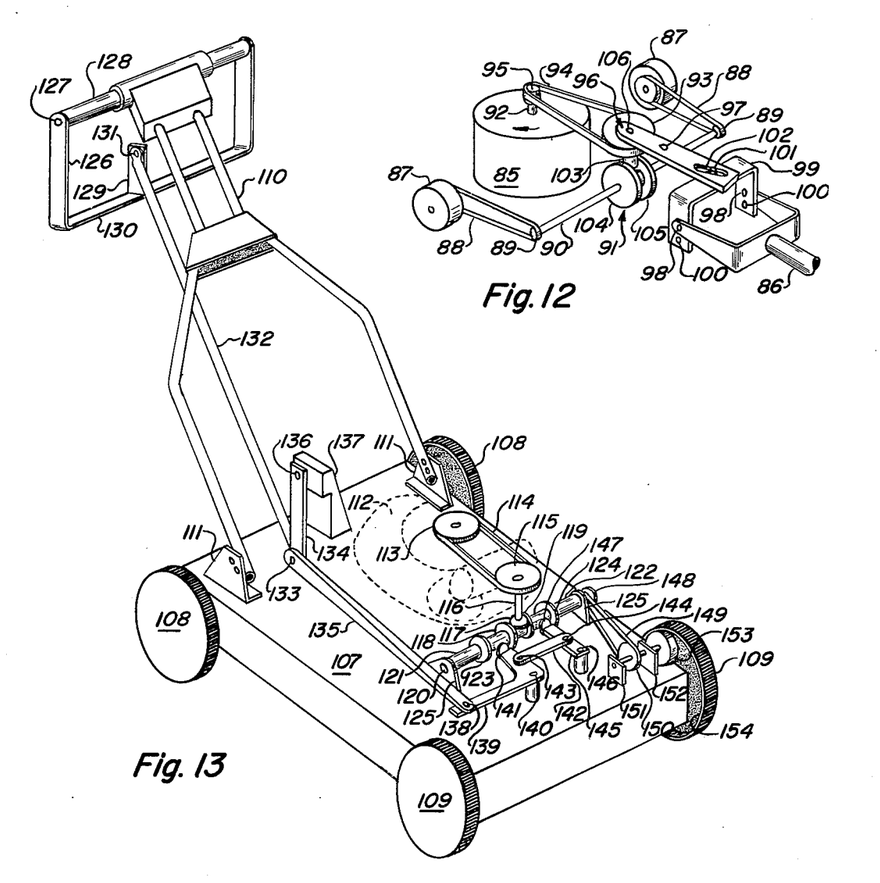
FIG. 12 is a schematic perspective view of a form of drive which may be applied to a suction cleaner.
FIG. 13 is a schematic perspective view of the invention applied to a lawnmower.

*FIG. 12.*—In this modification only a single driving element is used in the torque coupling which simplifies the construction a great deal.

It is intended to be used with a suction cleaner of any suitable construction.

The arrangement shown in schematic and the parts of the cleaner are not shown except for the motor fan unit 85 and the handle 86.

The traction wheels 87 are rotatably mounted on the frame of the machine in any suitable manner and are driven by belts 88, running over pulleys 89 secured to a shaft 90 driven in either direction by a torque coupling generally indicated by 91.

The shaft 92 of the motor-fan unit 85 rotates in a clockwise direction and drives the pulley 93 in a clockwise direction by means of a belt 94 threaded over a pulley 95 on the upper end of the shaft 92.

The pulley 93 is rotatably mounted on a pintle 106 on the forward end of a lever 96 pivotally mounted on the cleaner frame of the machine at 97.

The handle 86 is pivotally mounted at 98 to an inverted U-shaped lever 99, pivoted to the frame of the cleaner at 100.

Extending upwardly from the lever 99 is a pin 101 which enters a diagonal slot 102 in the rear end of the lever 96.

A frictional drive element 103 extends downwardly from the pulley 93 and is adapted to be moved back and forth into contact with friction discs 104 and 105 rigid with the shaft 90. The elements 103, 104 and 105 constitute the torque coupling 91.

*Operation of FIG. 12.*—The surfaces of the friction driving element 103 and of the discs 104 and 105 are such that there is always a slippage between them when the cleaner is in operation. Thus the power delivered by the motor is always greater than that delivered at the traction wheels 87 and the excess energy is dissipated in the form of heat caused by the slippage between the driving element 103 and the discs 104 or 105.

As shown the pintle 106 and the driver 103 have a commond axis and in FIG. 12 the driver 103 is in neutral position and out of contact with either of the discs 104 or 105.

A push on the handle 86 will pivot the U-shaped lever 99 counterclockwise and cause the pin 101 to move foreward in the slot 102, cause the lever 96 to pivot counterclockwise about pivot 97 and cause the driver 103 to move to the left and into contact with the disc 104 which will cause it to rotate counterclockwise at a speed less than that of pulley 93.

That will cause the shaft 90 and wheels 87 to rotate counterclockwise and the cleaner will move forward.

A rearward pull on the handle 86 will cause the driver 103 to frictionally engage the disc 105 and rotate it and the wheels 87 clockwise so that the cleaner will move rearward.

As in the other modifications the appliance will be started smoothly, stopped smoothly and reversed smoothly because of the slippage between the element 103 and the elements 104 and 105.

The force applied by the operator is small relative to that applied between the driver 103 and the discs 104 and 105, due to the mechanical advantage of the linkage system between the handle and the pulley 93. The mechanical advantage of the linkage system may be varied by varying the angle of the slot 102.

*FIG. 13.*—This modification of the invention is shown applied to a lawnmower having a rigid frame 107, supported on rear wheels 108 and front wheels 109, the latter being power driven as will appear. The gearing to the front wheels is shown schematically and the various parts are supported on the frame 107 by means, not shown.

A forked handle 110 is rigidly attached to the frame 107 by brackets 111. A motor 112, either electric or internal combustion, drives the cutter blade not shown. The wheels 109 are rotatably mounted at the forward end of frame 107 by a shaft not shown, which extends between the two wheels and to which the wheels 109 are rigidly secured.

A pulley 113 driven by the motor 112 drives a belt 114 which in turn drives a pulley 115.

The pulley 115 is connected by a shaft 116 to a bevel gear 117 in constant mesh with bevel gears 118 and 119 so that the gears 118 and 119 are driven in opposite directions as in the modification of FIG. 10.

The bevel gears 118 and 119 constitute the driving elements of a torque coupling similar to that of FIG. 10 and are freely rotatable and slidable on a shaft 120 which corresponds to the shaft 66 of FIG. 10.

The driven elements of the torque coupling are represented by the numerals 121 and 122 and are rigidly connected to the shaft 120.

Slippage devices 123 and 124 are positioned between the driving elements 118 and 119 and the driven elements 121 and 122 respectively and are provided with friction discs between them similar to the friction discs 62 and 63 of FIG. 10. Thus the devices 123 and 124 are of the constant slippage type which slip under any conditions of use and constitute the means by which the mower is compelled to move at the same speed as the operator.

The shaft 120 is supported from the frame 107 by suitable brackets 125 and thus will hold the gears 118 and 119 in operative relationship. The pulley 115, shaft 116 and gear 117 are mounted on the frame by means not shown.

An inverted U-shaped hand lever 126 is pivoted at 127 to the crossbar 128 of the handle 110 and is manipulated by the operator in actuating the drive mechanism for the traction wheels 109.

A bracket 129 extends upwardly from the bight 130 of lever 126. Pivoted at 131 to the upper end of bracket 129 is a connecting rod 132 with its lower end pivoted at 133, to a link 134 and to a second connecting rod 135. The purpose of the bracket 129 is to raise the pivot 131 for the rod 132 above the bight 130 of lever 126 and thus provide a mechanical advantage.

At its upper end the link 134 is pivoted at 136 to a bracket 137 mounted on the frame 107. The forward end of rod 135 is pivoted at 138 to the longer end of a bellcrank 139 pivotally supported from the frame 107 at 140.

A roller 141 is rotatably mounted on the end of the short leg of the bellcrank 139 and a link 142 is pivoted at 143 intermediate the ends of the short leg of the bellcrank 139. The other end of link 142 is pivoted at 144 to a lever 145 which is pivoted to the frame 107 at 146. A roller 147 is rotatably mounted on the inner end of lever 145.

The rollers 141 and 147 are adapted to engage the inner radial surfaces of flanges on the outer ends of the rotating driving elements 118 and 119 respectively and perform the same function as the roller 68 of FIG. 10.

Attached to the right hand end of shaft 120 is a sprocket 148, which drives a chain belt 149 threaded over a sprocket 150 fixed to a shaft 151 rotatably mounted on frame 107 by brackets 152.

Fixed to the end of shaft 151 is a gear 153 which engages gear teeth on the interior of rim 154 of the left hand traction wheel 109. As previously stated, both traction wheels 109 are connected by a common shaft, not shown.

The arrangement of the bellcrank 139 with relation to the rollers 141 and 147 results in a mechanical advantage to reduce the force necessary to be applied to the lever 126 to apply a greater force to the rollers and consequently to the slippage devices 123 and 124.

The motor 112 drives the pulleys 113 and 115 and gear 117 counterclockwise with the result that the gear 118 rotates clockwise and the gear 119 counterclockwise as viewed from the left of FIG. 13.

*Operation of FIG. 13.*—In the position shown the parts are in neutral with both slippage devices 123 and 124 inactive. A forward push on lever 126 will cause the roller 141 to move to the left and activate the slippage device 123. The shaft 120 will be rotated clockwise which will cause the wheels 109 to rotate clockwise and the mower will move forward. In a similar manner a pull on the lever 126 will cause the roller 147 to move to the right and activate slippage device 124. Since the gear 119 is rotating counterclockwise as viewed from the left of FIG. 13, the shaft 120 will also rotate counterclockwise as viewed from the left. That will cause the wheels 109 to rotate counterclockwise and the mower will move rearwardly.

If for any reason the mower should tend to slow down, as in going up hill, the operator in travelling at the same speed, will automatically apply more pressure to the lever 126 which will increase the pressure on the slippage devices and the mower will travel at the same speed as that of the operator.

Similarly, if the mower should tend to speed up, as in going down hill, the operator will automatically apply less pressure to the lever 126 which will decrease the pressure on the slip clutches and the mower will slow down to the speed of the operator. If the hill is steep a braking action may be applied by actuation of the reversing slippage device and its consequent slippage.

The mower of this modification is of particular advantage in mowing terraces and lawns which are uneven, since the effort applied by the operator is negligible.

It has been found that if a stiff extensible and compressible spring is substituted for link 135 on the lawnmower, FIG. 13, smoother operation results on rough terrain. The spring reduces the coupling between the lever 126 and the slippage devices 123 and 124 so that greater movement of the bight 130 is required for a given force applied to the slippage devices. The unwanted changes in force acting on the slippage devices caused by small movements of the lever produced by the mower striking bumps on the ground are thereby greatly reduced.

As in the other modifications, in starting, stopping and reversing the mower is brought up to speed smoothly, stopped smoothly and reversed smoothly without any conscious effort by the operator.

In making turns, downward pressure is applied to the crossbar 128 to lift the traction wheels 109 from the ground and the mower turned in the usual manner.

While I have shown a number of embodiments of my invention, there are many other embodiments known to me involving the slip torque coupling principle. The embodiments disclosed are not to be taken in a limiting sense but are to be taken as illustrative only. I do not wish to be limited to the particular structure shown and described but wish to include all equivalent variations thereof except as limited by the scope of the claims.

I claim:

1. An appliance adapted to be moved over a supporting surface upon propelling traction means,
   (a) a power source on said appliance,
   (b) transmission means drivingly connected between said power source and said propelling traction means,
   (c) said transmission means including at least one rotating driving element frictionally engaging a rotatable driven element, said driving element being movable toward and away from said driven element,
   (d) a handle on said appliance, and
   (e) manually actuatable force applying means movably mounted on said handle,
   (f) said manually actuatable force applying means being connected through force multiplying means to said driving element for moving said driving element toward and away from said driven element and infinitely varying between minimum and maximum limits the total fractional force between said driving and driven elements whereby during normal operation of said appliance said driving element always slips relative to said driven element and the speed ratio of the driven element to the driving element varies between minimum and maximum values and does not reach one to one.

2. An appliance as in claim 1 wherein said force multiplying means includes resilient means for absorbing small movements of said manually actuatable means with respect to said handle without transmitting any appreciable force to said driving element.

3. An appliance as in claim 1 wherein said force multiplying means includes a small diameter fluid force producer connected for actuation by said manually actuatable means and a large diameter fluid force producer connected for actuation of said driving element to move said driving element toward said driven element, said fluid force producers being connected by a tube.

4. The appliance of claim 1 wherein said force multiplying means is a mechanical system including a spring, said spring providing a cushioned movement between said manually actuatable means and said driving element.

5. An appliance adapted to be moved over a supporting surface upon propelling traction means,
   (a) a power source on said appliance,
   (b) transmission means drivingly connected between said power source and said propelling traction means,
   (c) said transmission means including two driven elements rotatably mounted in fixed spaced relationship, said driven elements having friction faces facing one another, said driven elements being drivingly connected with said propelling traction means,
   (d) two driving elements slidably and rotatably mounted between and adjacent said driven elements, each of said driving elements having a friction surface facing the friction surface on one of said driven elements and a driving surface facing substantially opposite said friction surface,
   (e) said driving elements being spaced apart and having their driving surfaces facing one another,
   (f) a rotatable vertical axis gear driven by said power source positioned between said driving elements,
   (g) said vertical axis gear being mounted for lateral movement to selectively bias against either of said driving surfaces and to force the friction surface on either of said driving elements into driving contact with a corresponding friction surface on one of said driven elements, and
   (h) selective means for moving said vertical axis gear laterally in either direction to bring said friction surfaces into engagement with one another and move said appliance either forward or backward.

6. An appliance adapted to be moved over a supporting surface upon propelling traction means,
   (a) a power source on said appliance,
   (b) transmission means drivingly connected between said power source and said propelling traction means,
   (c) said transmission means including two laterally spaced driven elements,
   (d) a driving element rotatably mounted between said driven elements, said driving element being rotatable by said power source,
   (e) said driving element being mounted for lateral movement to engage either of said driven elements, and
   (f) selective control means on said appliance for moving said driving element into engagement with either of said driven elements whereby the application of variable forces to said driving element through said control means varies the tractive force applied to said propelling traction means from said power source and during normal operation of said appliance said driving element always slips relative to said driven element and the speed ratio of the driven element to the driving element varies between minimum and maximum values and does not reach one to one.

7. A mechanism for transmitting driving force from force input means to movable force output means having a load thereon, said mechanism comprising;
   (a) an energy source connected with said input means and providing said input means with kinetic energy in excess of that required to overcome said load and drive said output means in ordinary operation,
   (b) transmission means between said input and output means for selectively transmitting variable force from said input means to said output means,
   (c) said transmission means including movably mounted driving and driven frictional force transmitting members for transmitting variable kinetic friction force therebetween from said input means to said output means to move said output means,
   (d) at least one of said frictional force transmitting members being mounted for movement toward and away from the other of said frictional force transmitting members to vary the normal force therebetween and thereby vary the amount of kinetic friction force transmitted therebetween,
   (e) said output means being adapted to be driven by said driven member at selectively variable speeds up to a predetermined maximum speed, said driving member being driven by said input means at a speed in excess of that transmitted to said driven member to drive said output means at all of said selectively variable speeds,
   (f) selective manually actuatable control means for infinitely varying between minimum and maximum values the normal force between said frictional force transmitting members,
   (g) said control means acting to increase the normal force between said frictional force transmitting members in correspondence with increasing manual force applied to said control means and acting to decrease the normal force therebetween in correspondence with decreasing manual force applied to said control means, (h) a first force transmitting path in said control means for transforming manually applied force into normal force between said frictional force transmitting members, (i) a second force transmitting path between said driven member and said output means, and (j) force multiplying means in one of said force transmitting paths for transmitting driving force from said input means to said output means in excess of manual force applied to said control means, (k) whereby said frictional force transmitting members always slip relative to one another in ordinary operation of said mechanism and variable amounts of kinetic friction force are transmitted therethrough from said input means to said output means by selective operation of said control means to vary the normal force therebetween.

8. The structure of claim 7 wherein said mechanism is embodied in a power propelled device and said output means comprises propelling traction means on said device for propelling said device on a supporting surface.

9. The device of claim 8 and further including handle means thereon for being grasped by an operator standing or walking behind said device to guide said device over a supporting surface, said control means being operatively connected with said handle means for actuation by manual force applied to said handle means.

10. The device of claim 9 wherein said transmission means is connected for transmitting force therethrough from said input means to said propelling traction means in two opposite directions to provide forward and rearward propulsion to said device, said control means having a substantially neutral position in which substantially no force is transmitted through said frictional force transmitting members from said input means to said propelling traction means, said control means being actuated by forward pushing force on said handle means to transmit variable forward propelling force through said frictional force transmitting members and being actuated by rearward pulling force on said handle means to transmit variable rearward propelling force through said frictional force transmitting members.

11. The mechanism of claim 7 wherein there are pairs of driving and driven frictional force transmitting members which are selectively alternately engageable through said control means to transmit force from said input means to said output means in two opposite directions.

12. An ambulatory device having power driven propelling traction means thereon to assist in propelling said device over a supporting surface, (a) force input means on said device for providing propelling force to said traction means through transmission means, (b) an energy source connected with said input means and providing said input means with kinetic energy in excess of that required to drive said traction means under ordinary operating loads thereon, (c) said transmission means including slippage type variable torque coupling means for selectively transmitting variable torque therethrough in opposite directions from said input means to said traction means to propel said device selectively in forward and rearward directions at variable speeds, (d) said traction means being adapted to be driven through said variable torque coupling at selectively variable speeds up to a predetermined maximum speed, said variable torque coupling being driven by said input means at a speed in excess of that transmitted therethrough to drive said traction means at all of said selectively variable speeds so that said variable torque coupling is slipping under all ordinary operating conditions, (e) handle means on said device for being grasped by an operator standing or walking behind said device to guide said device over a supporting surface, (f) selective manually actuatable control means operatively connected with said handle means and said variable torque coupling means for infinitely varying between minimum and maximum values the amount of torque transmitted through said variable torque coupling and for selecting the direction of propelling force transmitted to said traction means, (g) said control means having a substantially neutral position in which sunstantially no torque is transmitted through said variable torque coupling, (h) said control means being actuated by manual forward pushing force on said handle means to increase the amount of forward propelling torque transmitted through said variable torque coupling and being actuated by manual rearward pulling force on said handle means to increase the amount of rearward propelling torque transmitted through said variable torque coupling, (i) the connection through said control means from said handle means to said variable torque coupling defining a first force transmitting path, (j) the connection between said variable torque coupling and said traction means defining a second force transmitting path, and (k) force multiplying means in one of said force transmitting paths for transmitting propelling force from said input means to said traction means in excess of manual force applied to said control means, (l) whereby the direction and amount of propelling force supplied to said traction means from said input means through said variable torque coupling means corresponds to the direction and speed of an operator's movements in guiding said device over a supporting surface by grasping said handle means and applying manual pushing and pulling forces to said device through said handle means to selectively actuate said control means without conscious effort and thereby vary the direction and amount of torque transmitted through said variable torque coupling.

13. The device of claim 12 wherein said control means is movably mounted on said handle means and said control means is held within an operator's grasp in guiding said device over a supporting surface.

14. The device of claim 12 wherein said force multiplying means is in the connecting force path between said control means and said variable torque coupling means.

15. The device of claim 12 wherein said variable torque coupling means comprises a plurality of frictional force transmitting members and said control means is actuatable to provide forward and rearward torque transfer through altrenate ones of said frictional force transmitting members and is actuatable to vary the amount of torque transmitted through said frictional force transmitting members by varying the normal force between said frictional force transmitting members.

References Cited by the Examiner
UNITED STATES PATENTS

| | | | |
|---|---|---|---|
| 979,534 | 12/1910 | Michaud | 74—190 |
| 1,177,401 | 3/1916 | Du-So | 74—190 |
| 1,206,003 | 11/1916 | Landry | 74—190 |
| 1,305,871 | 6/1919 | Bohlmann | 74—191 |

DON A. WAITE, *Primary Examiner,*